US010504168B2

(12) United States Patent
Poltorak

(10) Patent No.: US 10,504,168 B2
(45) Date of Patent: *Dec. 10, 2019

(54) APPARATUS AND METHOD FOR FACILITATING A PURCHASE USING INFORMATION PROVIDED ON A MEDIA PLAYING DEVICE

(71) Applicant: General Patent Corporation, Int'l, Suffern, NY (US)

(72) Inventor: Alexander I. Poltorak, Monsey, NY (US)

(73) Assignee: POLTORAK MEDIA LLC, Suffern, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/964,995

(22) Filed: Apr. 27, 2018

(65) Prior Publication Data

US 2018/0365747 A1   Dec. 20, 2018

Related U.S. Application Data

(63) Continuation of application No. 15/055,487, filed on Feb. 26, 2016, now Pat. No. 10,062,095, which is a
(Continued)

(51) Int. Cl.
*G06Q 30/06* (2012.01)
*H04H 20/28* (2008.01)
(Continued)

(52) U.S. Cl.
CPC ....... *G06Q 30/0613* (2013.01); *G06Q 20/123* (2013.01); *G06Q 20/1235* (2013.01);
(Continued)

(58) Field of Classification Search
CPC .................................................. G06Q 30/0613
See application file for complete search history.

(56) References Cited

U.S. PATENT DOCUMENTS 5,963,916 A * 10/1999 Kaplan ................ G06Q 20/123
705/7.29
6,490,432 B1 * 12/2002 Wegener ............. H04M 3/4938
455/3.04
(Continued)

OTHER PUBLICATIONS

Letter of Jeffrey V. Lasker of Apple Corp., dated Sep. 7, 2018 (all pages).
(Continued)

*Primary Examiner* — Ankur Jain
(74) *Attorney, Agent, or Firm* — Anatoly S. Weiser, Esq.

(57) ABSTRACT

Disclosed are apparatus and method for facilitating a purchase in conjunction with media content information. The apparatus includes a receiver configured to receive a transmission of media content, information regarding the content, and information for facilitating a purchase of at least one of a copy of the content, a good, and/or a service. The content may include broadcast media content and entertainment media content. The apparatus also includes a processor configured to process the information regarding the content and the information for facilitating a purchase of the copy of the content, the good, and/or the service. The apparatus also includes a display device for displaying information.

21 Claims, 8 Drawing Sheets

Related U.S. Application Data continuation of application No. 15/017,520, filed on Feb. 5, 2016, now Pat. No. 9,626,707, which is a continuation of application No. 14/729,048, filed on Jun. 2, 2015, now Pat. No. 9,626,706, which is a continuation of application No. 14/030,998, filed on Sep. 18, 2013, now Pat. No. 9,111,311, which is a continuation of application No. 13/476,323, filed on May 21, 2012, now Pat. No. 8,583,028, which is a continuation of application No. 13/284,733, filed on Oct. 28, 2011, now Pat. No. 8,229,349, which is a continuation of application No. 12/881,099, filed on Sep. 13, 2010, now Pat. No. 8,078,097, which is a continuation of application No. 11/607,668, filed on Dec. 1, 2006, now Pat. No. 7,796,941, which is a continuation of application No. 10/328,776, filed on Dec. 24, 2002, now Pat. No. 7,164,882.

(51) Int. Cl.
| | | |
|---|---|---|
| *H04H 20/30* | (2008.01) | |
| *H04H 60/63* | (2008.01) | |
| *H04H 60/74* | (2008.01) | |
| *G06Q 20/12* | (2012.01) | |
| *G06Q 20/32* | (2012.01) | |
| *H04L 29/06* | (2006.01) | |
| *H04H 40/27* | (2008.01) | |
| *H04H 60/58* | (2008.01) | |
| *H04H 60/59* | (2008.01) | |
| *H04H 60/73* | (2008.01) | |
| *H04N 21/235* | (2011.01) | |
| *H04N 21/236* | (2011.01) | |
| *H04N 21/414* | (2011.01) | |
| *H04N 21/478* | (2011.01) | |
| *H04N 21/61* | (2011.01) | |
| *H04H 60/37* | (2008.01) | |

(52) U.S. Cl.
CPC ......... *G06Q 20/322* (2013.01); *G06Q 20/325* (2013.01); *G06Q 30/0623* (2013.01); *G06Q 30/0635* (2013.01); *G06Q 30/0641* (2013.01); *H04H 20/28* (2013.01); *H04H 20/30* (2013.01); *H04H 40/27* (2013.01); *H04H 60/58* (2013.01); *H04H 60/59* (2013.01); *H04H 60/63* (2013.01); *H04H 60/73* (2013.01); *H04H 60/74* (2013.01); *H04L 65/601* (2013.01); *H04N 21/2353* (2013.01); *H04N 21/23614* (2013.01); *H04N 21/41407* (2013.01); *H04N 21/47815* (2013.01); *H04N 21/6125* (2013.01); *H04H 60/37* (2013.01); *H04H 2201/30* (2013.01); *H04H 2201/37* (2013.01)

(56) References Cited

U.S. PATENT DOCUMENTS

| | | | | |
|---|---|---|---|---|
| 6,507,727 | B1 * | 1/2003 | Henrick | G06Q 30/06 348/E7.071 |
| 6,652,284 | B2 * | 11/2003 | August | A63B 24/0021 434/247 |
| 6,792,007 | B1 * | 9/2004 | Hamada | H04H 20/16 348/E5.002 |
| 7,346,558 | B2 * | 3/2008 | Rosenberg | G06Q 30/0253 705/26.82 |
| 8,051,455 | B2 * | 11/2011 | Kokernak | G06Q 30/02 725/113 |
| 8,290,820 | B2 * | 10/2012 | Plastina | G06Q 30/0641 455/440 |
| 8,307,092 | B2 * | 11/2012 | Svendsen | G06F 21/10 709/203 |
| 2002/0049037 | A1 * | 4/2002 | Christensen | G06Q 30/0267 455/3.06 |
| 2014/0351353 | A1 * | 11/2014 | Rosenberg | G06Q 30/06 709/206 |

OTHER PUBLICATIONS

Compaq iPAQ Pocket PC H3100 Series Quick Specs, dated Jun. 19, 2001 (all pages).

Compaq iPAQ H3000 Pocket PC Reference Guide, dated Jun. 2000 (all pages).

Letter of Lee Hill of Sony Mobile Communications, dated Jul. 16, 2018 (all pages).

Microsoft Invalidity contentions re U.S. Pat. No. 9,111,311 (Microsoft Corp., Mar. 16, 2018) (all pages).

Letter of Louise Bowman, attorney for Microsoft Corp., dated Mar. 16, 2018, re U.S. Pat. No. 9,311,111 (all pages).

\* cited by examiner

APPARATUS AND METHOD FOR FACILITATING A PURCHASE USING INFORMATION PROVIDED ON A MEDIA PLAYING DEVICE

CROSS-REFERENCE TO RELATED APPLICATIONS

This application is a continuation of and claims priority to U.S. patent application Ser. No. 15/055,487, entitled APPARATUS AND METHOD FOR FACILITATING A PURCHASE USING INFORMATION PROVIDED ON A MEDIA PLAYING DEVICE, filed Feb. 26, 2016, now allowed; whish is a continuation of and claims priority to U.S. patent application Ser. No. 15/017,520, entitled APPARATUS AND METHOD FOR FACILITATING A PURCHASE USING INFORMATION PROVIDED ON A MEDIA PLAYING DEVICE, filed Feb. 5, 2016, now U.S. Pat. No. 9,626,707; which is a continuation of and claims priority to U.S. patent application Ser. No. 14/729,048, entitled APPARATUS AND METHOD FOR FACILITATING A PURCHASE USING INFORMATION PROVIDED ON A MEDIA PLAYING DEVICE, filed Jun. 2, 2015, now U.S. Pat. No. 9,626,706; which is a continuation of and claims priority to U.S. patent application Ser. No. 14/030,998, entitled APPARATUS AND METHOD FOR FACILITATING A PURCHASE USING INFORMATION PROVIDED ON A MEDIA PLAYING DEVICE, filed Sep. 18, 2013, at now U.S. Pat. No. 9,111,311; which is a continuation of and claims priority to U.S. patent application Ser. No. 13/476,323, entitled APPARATUS AND METHOD FACILITATING A PURCHASE USING INFORMATION PROVIDED ON A MEDIA DEVICE, filed May 21, 2012, now U.S. Pat. No. 8,583,028; which is a continuation of and claims priority to U.S. patent application Ser. No. 13/284,733, entitle APPARATUS AND METHOD FOR FACILITATING A PURCHASE USING INFORMATION PROVIDED ON A MEDIA PLAYING DEVICE, filed Oct. 28, 2011, now U.S. Pat. No. 8,229,349; which is a continuation of and claims priority to U.S. patent application Ser. No. 12/881,099, entitled APPARATUS AND METHOD FOR FACILITATING A PURCHASE USING INFORMATION PROVIDED ON A MEDIA PLAYING DEVICE, filed on Sep. 13, 2010, now U.S. Pat. No. 8,078,097; which is a continuation of and claims priority to U.S. patent application Ser. No. 11/607,668, entitled APPARATUS AND METHOD FOR FACILITATING A PURCHASE USING INFORMATION PROVIDED ON A MEDIA PLAYING DEVICE, filed on Dec. 1, 2006, now U.S. Pat. No. 7,796,941; which is a continuation of and claims priority to U.S. patent application Ser. No. 10/328,776, entitled APPARATUS AND METHOD FOR FACILITATING A PURCHASE USING INFORMATION PROVIDED ON A MEDIA PLAYING DEVICE, filed on Dec. 24, 2002, now U.S. Pat. No. 7,164,882. The disclosures of all of the patent documents identified above are incorporated herein by reference as if fully set forth herein, including Figures, Claims, Tables, and all other matter in the patent documents.

FIELD OF THE INVENTION

The present invention pertains to an apparatus and method for facilitating a purchase using information provided on a media playing device and, in particular, to an apparatus and method for facilitating a purchase by utilizing information provided concerning media content which is broadcast to a media playing device and/or by utilizing information concerning media content which is being played on a media playing device.

BACKGROUND OF THE INVENTION

Millions of individuals listen to radio stations and/or television stations each day. Individuals utilize radios in order to listen to music, radio programs, radio news programs, and/or radio talk shows, etc. Individuals utilize television order to watch television programs, television shows, television news programs, television talk shows, movies, and/or music videos, etc.

As many individuals can attest, oftentimes a song may be playing which the listener desires to purchase. For example, a listener can be listening to a song, find it enjoyable, and desire to purchase a copy of the song or a copy of the album on which the song is featured. Typically, in order to effect such a purchase, the individual will have to obtain information regarding the song, such as, for example, the name of the song, the performer who is performing the song, or any other information (i.e. the name of the album on which the song may be featured or found, etc.), the retailer or distributor of the song or album, and/or the price of a copy of the song or a copy of the album on which the song is featured. Thereafter, the individual can purchase the copy of the respective song or album.

More often than not, however, an individual's desire to purchase a copy of a respective song or album is stronger at the time the individual is listening to same. Some may argue that the desire can fade away if not acted upon quickly. In this manner, individuals may not satisfy their desires and producers or distributors of the respective songs or albums can be deprived of sales which could have been made had the individual been able to act on his or her impulse.

In a similar manner, there are many instances in which an individual may be watching a television show, program, or movie and, finding same to be enjoyable, desire to purchase a copy of same. Typically, in order to effect such a purchase, the individual may have to obtain information regarding the respective show, program or movie, such as, for example, the name of the respective show, program, or movie, retailer or distributor of the respective show, program, or movie, and/or the price of a copy of the respective show, program, or movie. Thereafter, the individual can purchase the copy of the respective show, program, or movie.

In a similar manner, there are many stances in which an individual may be listening a radio or watching a television advertisement and, finding same to be desirable, desire to purchase a the object of the advertisement. Typically, in order to effect such a purchase, the individual may have to write down a telephone number and or the Internet website address (URL). Thereafter, the individual can purchase the subject of the respective advertisement by dialing the telephone number or visiting the website.

More often than not, however, a desire to purchase a copy of a respective show, program, or movie, is stronger at the time the individual is viewing same. Here too, some may argue that the desire can fade away if not acted upon quickly. In this manner, individuals may not satisfy their desires and producers or distributors of the respective shows, programs, movies, or vendors of the objects of advertisement, can be deprived of sales which could have been made had the individual been able to act on his or her in pulse.

In today's information age, individuals are use to, and typically expect, if not demand, to be able to make purchases and/or to otherwise act on their desires in an instant. Yet, in spite of this, no system or apparatus is currently available which can provide an individual with the ability to purchase a copy of respective song, album, television show, television program, movie, or object of advertisement instantly either during or in conjunction with, a broadcast of same, or shortly thereafter. Further, no system or apparatus is currently available which can facilitate the purchase of a copy of a respective song, album, television show, television program or movie, or object of advertisement via a respective media playing device, such a radio or television, on or over which the respective song, album, television show, television program, or movie, is being played.

SUMMARY OF THE INVENTION

The present invention pertains to an apparatus and method for facilitating a purchase using information provided on a media playing device which overcomes the shortfalls of the prior art. The present invention pertains to an apparatus and method for facilitating a purchase using information provided on a media playing device by utilizing information which pertains to the media content which is broadcast to the media playing device and/or which is being played on a media playing device.

The present invention provides an apparatus and method for providing information regarding the content of a radio broadcast, a television broadcast, and/or a media broadcast of any kind or type, and/or information regarding content which can be stored on a conventional storage medium. The information provided can include any information, descriptive matter, and/or other subject matter, regarding the media content and or for facilitating a purchase transaction involving same.

The present invention provides an apparatus and method for providing information regarding media content which is broadcast to, and/or played by, a media playing device. The present invention can display information pertaining to the media content, information pertaining to a purchase of a copy of the media content, and/or information for engaging in a transaction(s) involving the media content and/or a copy of same. The information can be displayed and/or can be stored in the media playing device during the playing of the media content.

The present invention can allow an individual to effect a purchase or engage in a transaction with a central processing facility by utilizing the information displayed at, and/or stored in, the media playing device.

The present invention can be utilized in order to provide information regarding, relating to and/or descriptive of, radio programs, songs, television programs, television shows, movies, commercial advertising, and/or audio or video information of any kind. The respective radio programs, songs, television programs, television shows, movies, advertising, and/or audio or video information, can be broadcast from a broadcasting system or broadcasting station.

The respective radio programs, songs, television programs, television shows, movies, advertisements, and/or audio or video information, can be broadcast as a five broadcast of media content, or as a broadcast of pre-recorded or taped media content.

The information can be provided along with, and/or in conjunction with, the respective stored radio programs, songs, television programs, television shows, movies, advertisements, and/or audio or video information, on a storage medium which can include, but which is not limited to, a video cassette, a film, a digital video disc (DVD), a compact disc (CD), a laser disc, a tape, and MP3 file storage medium, and/or any other electronic, magnetic, optical and/or any other storage media.

The respective radio programs, songs, television programs, television shows, movies, advertisements, and/or audio or video information, can be broadcast from a respective radio broadcaster, television broadcaster, and/or other media broadcaster.

The information which can be provided along with, and/or in conjunction with, the respective radio programs, songs, television programs, television shows, movies, advertisements, and/or audio or video information (hereinafter referred to as "media content") can include the name or title of the media content, the respective performer(s), singer(s), actor(s), director(s), producer(s), writer(s), composer(s) involved in, and/or featured in, the respective media content (i.e. a song performer, a movie actor, a producer, etc.), a description of the media content (i.e. song lyrics description, movie theme, etc.), the year produced, the description and/or benefits of the object of advertisement (i.e. a product or a service), and any cost or price information regarding same (i.e. song album price, movie video price, product price, etc.).

The information can also include a unique identification number which can be assigned to and/or which can be associated with each particular selection of media content as well as any information which can or which may be needed and/or desired for ordering the media content and/or for processing a transaction involving the media content.

The information, which can be provided by the present invention, can also include information regarding goods or services which information can be provided to a user along with, and/or in addition to, the other herein-described information regarding the media content. The information regarding goods or services can include marketing information, sales information, promotional information, advertisement information, and/or any other information for facilitating a sale of a respective good or service and/or for prompting a respective good or service.

The present invention can provide a display of the information for viewing by an individual or it can store information, which can be concealed from the individual. The information can be stored at the media playing device, which can utilize certain of the information in order to facilitate a transaction involving same.

Upon an individual ordering or requesting to purchase of a copy of media content, or any other good or service, the present invention can access any stored information and transmit same along with the order or purchase request, to a central processing facility computer via any communication network. The order or purchase request, along with the information can then be utilized in order to facilitate the processing of the individual's order or purchase request. In instances when the information is concealed from the individual, the individual can place the order or purchase request without having to know the information regarding the media content.

The apparatus of the present invention can include a broadcasting system, which can broadcast any of the media content described herein. Any number of broadcasting systems can be utilized in conjunction with the apparatus of the present invention.

The apparatus of the present invention can also include a media playing device, which can receive broadcasts from any of the broadcasting systems described herein. The broadcasts can include any of the herein-described media content. The media playing device can be associated with one or more individuals or users of the apparatus.

The media playing device can be any one of more of a radio, a television, a computer, or other device for receiving and/or playing broadcasts or transmissions of media content. Any number of media playing devices can be utilized in conjunction with the apparatus of the present invention.

The apparatus of the present invention can also include a central processing facility computer, which can process purchase orders or purchase requests that can be received from users of the media playing devices. Any number of central processing facility computers can be utilized in conjunction with the apparatus of the present invention.

The apparatus of the present invention can operate, and/or can be utilized, on, over, and/or in conjunction with, any suitable communication network or system which can include but which is not limited to any one or more of a radio frequency (RF) communication network or system, a cable television communication network or system, a telecommunications network or system, a satellite communications network system, a closed-circuit communication network or system, the Internet, the World Wide Web, a wireless communication network, a wireless Internet communication network, and/or a wireless World Wide Web communication network.

The apparatus can also operate and/or can be utilized on, over, and/or in conjunction with, any other suitable communication network or system.

The broadcasting system can include broadcasting equipment, which can include any and all of the components and/or system components commonly found in traditional broadcasting systems for facilitating the functionality of the respective media broadcasting system.

The broadcasting system can also include a central processing computer for controlling the operation of the broadcasting system and a memory device for storing any information needed and/or desired for performing the functionality described herein as being performed by the present invention.

The broadcasting system can also include a receiver for receiving data and/or information, which can be transmitted to the broadcasting system from any of the media playing devices and/or any of the central processing facility computers. The broadcasting system can also include a transmitter for transmitting data and/or information to any of the media playing devices and/or any of the central processing facility computers.

The media content can be provided with any of the herein-described information, which can be provided in a header field and/or which can be encoded into the main body of the media content. The information can be encoded with the media content of a live broadcast and/or with the live broadcast of media content, which is being broadcast from a stored medium. The information can encoded and/or transmitted in any other suitable way.

The media playing device can include media playing device equipment, which can include any and/or all of the components and systems of the respective media playing device. The media playing device can also include a central processing unit (CPU) and/or computer chip for controlling the operation of the media playing device.

The media playing device can also include an input device, which can include a remote control device, for inputting information and/or commands into the media playing device. The media playing device can also include a display device for displaying any of the information described-herein as being provided by the present invention.

The media playing device can also include a receiver for receiving data and/or information which can be transmitted to the media playing device from any of the broadcasting system and/or any of the central processing facility computers. The media playing device can also include a transmitter for transmitting data and/or information to any of the broadcasting systems and/or any of the central processing facility computers.

The central processing facility computer can include a central processing computer for providing control over the central processing facility computer. The central processing computer can also be utilized in order to process purchase orders, purchase requests, and/or any other transactions, involving the media content.

The central processing facility can also include a memory device for storing any of the data and/or in needed and/or desired for processing any of the transactions described herein and/or for performing any of the other functions and/or processing routines described herein as being performed by the central processing facility computer.

The central processing facility computer can also include an input device, for inputting information and/or commands into the central processing facility computer, and a display device for displaying any of the information described-herein as being provided by the present invention.

The central processing facility computer can also include a receiver for receiving data and/or information which can be transmitted to the central processing facility computer from any of the media playing devices and/or any of the broadcasting systems. The central processing facility computer can also include a transmitter for transmitting data and/or information to any of the media playing devices and/or any of the broadcasting systems.

The broadcasting system can broadcast or transmit the media content along with the information regarding the media content to the media playing device associated with the individual. The media playing device can receive the broadcast and process the information regarding the media content. The media playing device can play the media content and can either display the information regarding to the media content to the individual and/or store same in the memory device of the media playing device. The information can also be concealed from the individual's viewing.

At any time during the playing of the media content, the individual can place an order to buy or purchase a copy of same. The individual can also place an order to buy or purchase any good or service for which information is provided. The individual can enter a purchase order or purchase request regarding the media content, good, or service, into the media playing device. The media playing device can process the purchase order or purchase request in conjunction with the information regarding the media content, good or service, and generate a purchase request message which can then be transmitted to the central processing facility computer.

The central processing facility computer can process the transaction involving the information contained in the purchase request message. The central processing facility computer can also consummate the transaction, arrange for payment from the individual, and/or arrange for a shipment of the copy of the media content to the individual. The central processing facility computer can also generate an order confirmation message and transmit same to the individual.

Accordingly, it is an object of the present invention to provide an apparatus and method for facilitating a purchase using information provided on a media playing device.

It is another object of the present invention to provide an apparatus and method for facilitating a purchase using information provided on a media playing device by utilizing information which pertains to the media content which is broadcast to a media playing device.

It still another object of the present invention to provide an apparatus and method for facilitating a purchase using information provided on a media playing device by utilizing information which pertains to the media content which is being played on a media playing device.

It is yet another object of the present invention to provide an apparatus and method for facilitating a purchase using information provided on a media playing device which can provide information regarding and/or in conjunction with, the content of a radio broadcast, a television broadcast and/or a media broadcast.

It is another object of the present invention to provide an apparatus and method for facilitating a purchase using information provided on a media playing device which can provide information regarding the media content which can be stored on a storage medium.

It is still another object of the present invention to provide an apparatus and method for facilitating a purchase using information provided on a media playing device which can provide information in conjunction with live broadcasts of media content and/or broadcasts of pre-recorded media content.

It is yet another object of the present invention to provide an apparatus and method for facilitating a purchase sing information provided on a media playing device which can provide information which can include any one or more of a name or title of the media content, a respective performer(s), singer(s), actor(s), director(s), producer(s), writer(s), composer(s), involved in, and/or featured in, the respective media content, a description of the media content, the year produced, order it regarding the media content, and/or any cost or price information regarding the media content.

It is another object of the present invention to provide an apparatus and method for facilitating a purchase using information provided on a media playing device which can be utilized on, over, or in conjunction with, any one or more of a radio frequency (RF) communication network or system, a cable television communication network or system, a telecommunications network or system, a satellite communications network, and/or a closed-circuit communication network or system.

It is still another object of the present invention to provide an apparatus and method for facilitating a purchase using information provided on a media playing device which can be utilized on, over, or in conjunction with, any one or more of the Internet, the World Wide Web, a wireless communication network, a wireless Internet communication network and/or a wireless World Wide Web communication network.

It is yet another object of the present invention to provide an apparatus and method for facilitating a purchase using information provided on a media playing device which can be utilized in conjunction with media content wherein the information is any one or more of, encoded into, multiplexed with, mixed with, and/or transmitted in conjunction with, the media content.

It is another object of the present invention to provide an apparatus and method for facilitating a purchase using information provided on a media playing device which can be provided as a header file to the media content.

It is still another object of the present invention to provide an apparatus and method for facilitating a purchase using information provided on a media playing device which can be utilized conjunction with media content which can be received and processed at a media playing device.

It is yet another object of the present invention to provide an apparatus and method for facilitating a purchase using information provided on a media playing device which can display the information to a respective listener or viewer.

It is another object of the present invention to provide an apparatus and method for facilitating a purchase using information provided on a media playing device which can store the information at the media playing device.

It is still another object of the present invention to provide an apparatus and method for facilitating a purchase using information provided on a media playing device which can conceal the information from a listener or viewer.

It is yet another object of the present invention to provide an apparatus and method for facilitating a purchase using information provided on a media playing device which can provide information pertaining to purchasing a copy of the media content.

It is another object of the present invention to provide an apparatus and method for facilitating a purchase using information provided on a media playing device which can provide information for engaging in a transaction involving the media content and/or a copy of same.

It is still another object of the present invention to provide an apparatus and method for facilitating a purchase using information provided on a media playing device which can allow an individual to effect a purchase by utilizing the information provided along with the media content.

It is yet another object of the present invention to provide an apparatus and method for facilitating a purchase using information provided on a media playing device which can allow an individual to transmit an order or request for the media content, or a copy of same, to a central processing facility computer.

It is another object of the present invention to provide an apparatus and method for facilitating a purchase using information provided on a media playing device which can process art order or request for the media content or for a COPY of same.

It is still another object of the present invention to provide an apparatus and method for facilitating a purchase using information provided on a media playing device which can process a purchase order in conjunction with information regarding the media content.

It is another object of the present invention to provide an apparatus and method for facilitating a purchase using information provided on a media playing device which can also provide information regarding goods and services along with, and/or in addition to, the information regarding the media content.

It is still another object of the present invention to provide an apparatus and method for facilitating a purchase using information provided on a media playing device which can allow an individual to transmit an order or request for a good or service to a central processing facility computer.

It is yet another object of the present invention to provide an apparatus and method for facilitating a purchase using information provided on a media playing device which can process an order or request for a good or service.

It is another object of the present invention to provide an apparatus and method for facilitating a purchase using information provided on a media playing device which can process a purchase order in conjunction with information regarding a good or service.

It is still another object of the present invention to provide an apparatus and method for facilitating a purchase using information provided on a media playing device which can generate a purchase request message.

It is yet another object of the present invention to provide an apparatus and method for facilitating a purchase using information provided on a media playing device which can transmit a purchase request message to a central processing facility.

It is another object of the present invention to provide an apparatus and method for facilitating a purchase using information provided on a media playing device which can process a transaction involving information contained in a purchase request message.

It is still another object of the present invention to provide an apparatus and method or facilitating a purchase using information provided on a media playing device which can consummate a transaction.

It is yet another object of the present invention to provide an apparatus and method for facilitating a purchase using information provided on a media playing device which can generate an order confirmation message regarding a transaction.

It is another object of the present invention to provide an apparatus and method for facilitating a purchase using information provided on a media playing device which can transmit an order confirmation message regarding a transaction to an individual.

Other objects and advantages of the present invention will be apparent to those skilled in the art upon a review of the Description of the Preferred Embodiments taken in of with the Drawings, which follow.

DESCRIPTION OF THE PREFERRED EMBODIMENTS

Figure 1:
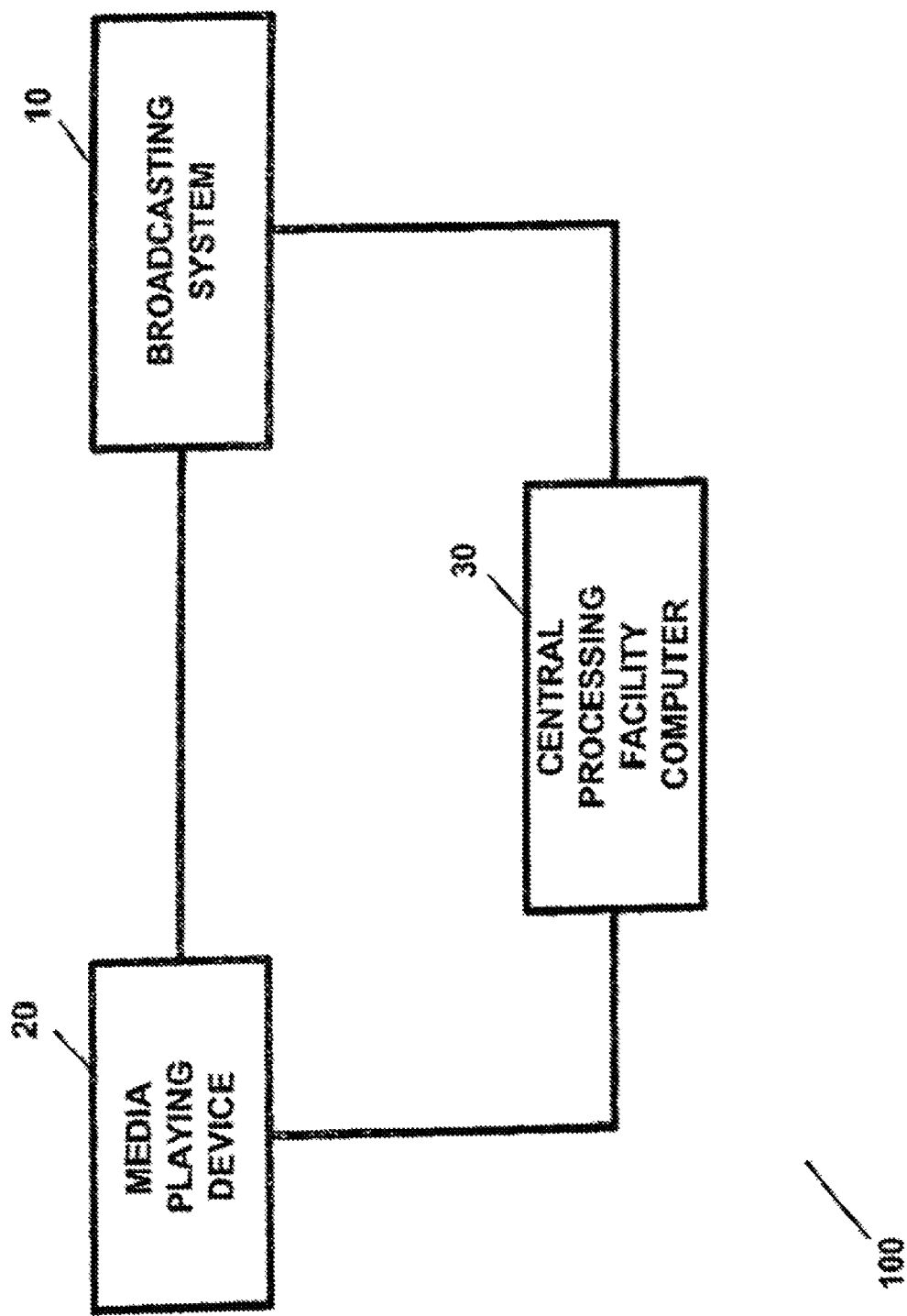
FIG. 1 illustrates a preferred embodiment of the apparatus of the present invention, in block diagram form.

The present invention pertains to an apparatus and method for facilitating a purchase using information provided on a media playing device and, in particular, to an apparatus and method for facilitating a purchase by utilizing information provided concerning media content which is broadcast to a media playing device and/or by utilizing information concerning media content which is being played on a media playing device.

The present invention provides an apparatus and method for providing information regarding the content of a television broadcast, a radio broadcast, and/or a media broadcast of any kind or type, and/or information regarding content which can be stored on a conventional storage medium.

The information provided can include any information, descriptive matter, and/or other subject matter, regarding the media content as well as information for identifying the media content and/or for facilitating a purchase or transaction involving same. In this manner, the present invention provides an apparatus and method for providing information regarding media content which is being broadcast to, or played by, a media playing device.

The information can be displayed and/or can be stored in the media playing device during the playing of same. The individual can effect a purchase or a transaction, involving the media content and/or a copy of same, with a central processing facility by utilizing the information displayed at, and/or stored in the media playing device during the broadcast of, or during the playing of, the media content.

In the preferred embodiments of the present invention, the apparatus and method can be utilized in order to provide information regarding, relating to, and/or descriptive of radio programs, songs, television programs, television shows, movies, and/or audio or video information of any kind. The respective radio programs, songs, television programs, television shows, movies, and/or audio or video information of any kind, can be broadcast from a broadcasting system or broadcasting station.

The respective radio programs, songs, television programs, television shows, movies, and/or audio or video information of any kind, can be broadcast as a live broadcast of media content or as a broadcast of prerecorded or taped media content.

In another preferred embodiment, the information can be provided along with, and/or in conjunction with, the respective stored radio programs, songs, television programs, television shows, movies, and/or audio or video information, on a storage medium which can include, but which is not limited to, a video cassette, a film, a digital video disc, a compact disc, a laser disc, a tape, an MP3 file storage device, and/or any other electronic and/or magnetic storage medium.

The respective radio programs, songs, television programs, television shows, movies, radio programs, songs, and/or audio or video information, which can be stored on the respective storage medium, can be broadcast from a respective radio broadcaster, television broadcaster, and/or other media broadcaster, and/or can be utilized on a user's media playing device which can include, but which is limited to, a radio, a television, a personal computer, a compact disc player, a video disc player, a laser disc player, a video cassette recorder, a video cassette player, a tape player, an MP3 player, and/or any other suitable media playing device.

The information which can be provided along with and/or in conjunction with, the respective television programs, radio programs, songs, television shows, movies, radio programs, songs, and/or audio or video information, (hereinafter referred to as "media content") can include the name or title of the media content, the respective performer(s), singer(s), actor(s), director(s), producer(s), writer(s), composer(s), involved and/or featured in, the respective media content (i.e. a song performer, a movie actor, a producer, etc.), a description of the media content (i.e., song, lyrics description, movie theme, etc.), the year produced, order information regarding the media content, and any cost or price information regarding the media content (i.e., song album price, movie video price).

The information can also include a unique identification number which can be assigned to, and/or which can be associated with, each particular selection of media content as well as any information which can or may be needed and/or desired for ordering the media content and/or for processing a transaction involving the media content.

The unique identification number can be utilized in order to identify a particular selection of media content, song, program, movie, etc., for any appropriate reason, such as for broadcast planning, for media content sales, etc., as well as for facilitating the processing of transactions involving the media content. The information can also include any other data and/or information which can be related to the media content.

The information which can be provided by the present invention can also include information regarding goods or services which information can be provided to a user along with, and/or in addition to, the Whet hereindescribed information regarding the media content. The information regarding goods or services can include marketing information, sales information, promotional information, advertisement information, and/or any other information for facilitating a sale of a respective good or service and/or for promoting a respective good or service.

As defined herein, the term "media playing device", or the plural of same, refers to radios, radio receivers, stereos, televisions, compact disc players, digital video disc players, laser disc players, tape players, video cassette players, computers, MP3 players, and/or any other suitable devices or systems which can be utilized in order to receive and present broadcasts of the media content described herein (i.e., radio broadcasts, television program broadcasts, media broadcasts, etc.), and/or any other suitable device which can play or present media content from a storage medium.

As defined herein, the terms "broadcaster", "media provider", or the plurals of same, refer to any broadcasters, radio broadcasters, television broadcasters, media broadcasters, and/or any providers or broadcasters of any of the herein-described media content.

The apparatus and method of the present invention provide information regarding media content, such as for example, a song, a television show, a movie, a radio program, etc., and/or information regarding any good(s) or service(s), by displaying said information to an individual listener, viewer, or receiver, of the respective media content. For example, information regarding a song which is being broadcast by a radio station can be provided on a suitable display device located on an individual's media playing device, radio, television, stereo, and/or remote control device.

The information can include any one or more of the name of the song, the album, if any, on which the song is featured, the artist(s) or performer(s) performing the song, the producer(s) of the song, the composer(s) of the song, the theme of the song or the song's lyrics, the year produced, and/or the price(s) of a single recording and/or the price(s) of the album(s) featuring the song.

In another preferred embodiment, the information can be concealed from the individual and/or can otherwise be non-viewable by the individual, but instead, can be stored at, or in, the media playing device. The media playing device 20 can utilize certain of the information in order to facilitate a transaction involving the media content. For example, information regarding a song being played on a media playing device such as, far example, a radio, can be stored in a buffer or memory inside the radio.

If the individual should decide to purchase a song single or an album on which the song is featured, or any good or service, he or she can place an order by utilizing the input device of the radio. The radio can access the information stored in the buffer or memory and transmit same along with an order or request, to a central processing facility computer, via the communication network. The order or request, along with the information, can then be utilized in order to facilitate the processing of the individual's order without the individual having to know the information regarding the media content.

In an embodiment where the information is provided to the individual, such as by being displayed on a display device, the individual can be apprised of the information, including the price of the respective media content, good, or service, prior to placing the order for same.

In the case of a television show, program, or movie, the information can include any one or more of the name of the show, program, or movie, the actor(s) featured in the show, program, or movie, the producer(s) and/or director(s) of the show, program or movie, the writer(s) or composer(s) of the show, program, or movie, the theme at the show, program, or movie, the year produced, and/or the price of a recording or a copy of the show, program, or movie.

In the case of any other media content, the information can include any of the above-described information and/or any other information which may be relevant to, and/or pertinent to, the content or media content.

FIG. 1 illustrates the apparatus of the present invention which is designated generally by the reference numeral 100. With reference to FIG. 1, the apparatus includes a broadcasting system 10 which can broadcast any of the media content described herein. Any number of broadcasting systems 10 can be utilized in conjunction with the apparatus 100 of the present invention. Each broadcasting system 10 can be associated with one or more of a radio broadcaster, a television broadcaster, a media broadcaster, a multimedia broadcaster, a radio station, a television station, or other media provider.

With reference once again to FIG. 1, the apparatus 100 also includes media playing device 20 which can receive broadcasts from any of the broadcasting systems 10 described herein. The media playing device 20 can be associated with one or more it or users of the apparatus 100.

In the preferred embodiment, the media playing device 20 can be any one of more of a radio, a television, and/or media receiver, for receiving broadcasts.

In another preferred embodiment, the media playing device 20 can be any one or more of a personal computer, a compact disc player, a video disc player, a digital versatile disc player, a laser disc player, a video cassette recorder, a video cassette player, a tape player, an MP3 player, and/or any other suitable media content playing device. The media playing device 20 can also be any suitable device for playing media content from a storage medium. Any number of media playing devices 20 can be utilized in conjunction with the apparatus 100 of the present invention.

With reference to FIG. 1, the apparatus 100 also includes a central processing facility computer 30. The central processing facility computer 30 can process purchase orders or purchase requests which can be received from users of the media playing devices 20. Any number of central processing facility computers 20 can be utilized in conjunction with the apparatus 100 of the present invention.

As will be described herein, the apparatus 100 can be utilized in order to facilitate the purchase of, or the ordering of, media content, goods, or services, by utilizing information regarding the respective media content, goods, or services, which is broadcast and/or transmitted along with, and/or in conjunction with, the media content. The central processing facility computer 30 can process a transaction involving any of the herein-described media content, goods, or services, by processing purchase order or purchase request information along with any of the information which was provided in conjunction with the broadcast or transmission of the media content.

The apparatus 100 can operate and/or can be utilized on, over, and/or in conjunction with, any suitable communication network or system which can include any one or more of a radio frequency (RF) communication network or system a cable television communication network or system, a telecommunications network or system, a closed circuit communication network or system, the Internet the World Wide Web, a wireless communication network, a wireless Internet communication network, and/or a wireless World Wide Web communication network. The apparatus 100 can also operate and/or can be utilized on, over, and/or in conjunction with, any other suitable communication network or system.

Figure 2:
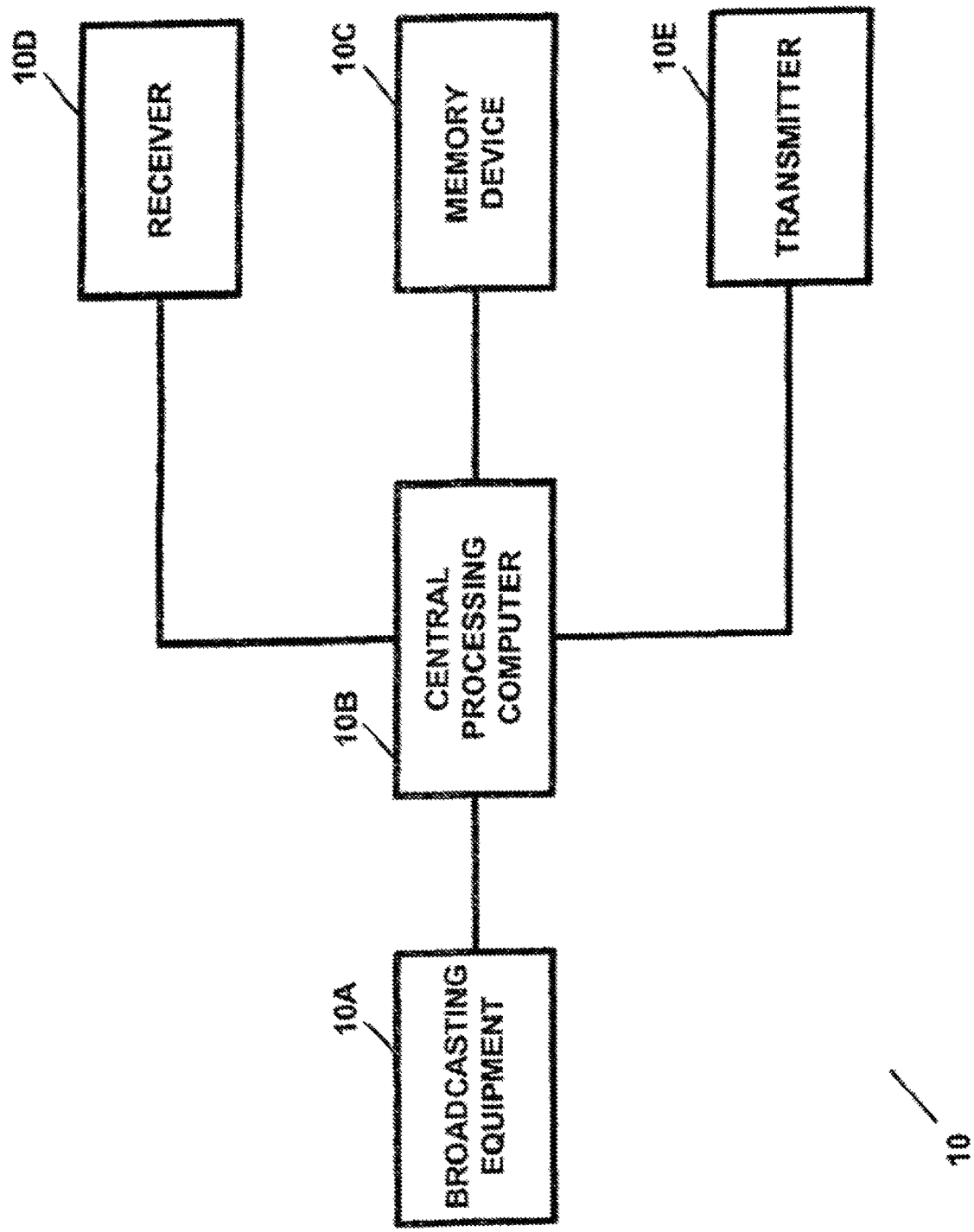
FIG. 2 illustrates the broadcasting system of FIG. 1, in block diagram form.

FIG. 2 illustrates the broadcasting system 10 of FIG. 1 in block diagram form. With reference to FIG. 2, the broadcasting system 10 includes broadcasting equipment 10A which can include any and all of the components and/or system components commonly found in traditional broadcasting systems. In the case of a radio broadcasting system, the broadcasting equipment 10A can include any and/or all of the components commonly found in, and/or associated with, a conventional radio broadcasting system. Similarly, in the case of a television broadcasting system, the broadcasting equipment 10A can include any and/or all of the components commonly found in, and/or associated with, a conventional television broadcasting system. In the case of media broadcasting systems of any kind or type, the broadcasting equipment 10A can include any and/or all of the components needed and/or desired for facilitating the functionality of the respective media broadcasting system.

With reference to FIG. 2, the broadcasting system 10 can also include a central processing computer 10B and associated memory device 10C. The central processing computer 10B can include a processor(s), a random access memory (RAM) device(s), a read only memory (ROM) device(s), an input device(s), a display device(s), an output device(s), and/or any other components or devices, including peripheral devices, for performing any of the functionality described herein. The central processing computer 10B can be linked to, or connected to, the broadcasting equipment 10A. The memory device 10C can also be linked to, or connected to, the central processing computer 10B.

The memory device 10C can contain any of the information described herein as being provided with the respective media content. For example, the memory device 10C can contain, for any given song provided pursuant to the teachings of the present invention, any one or more of the name of the song, the album, if any, on which the song is featured, the artist(s) or performer(s) performing the song, the producer(s) of the song, the composer(s) of the song, the theme of the song or the song's lyrics, the year produced, and for the price(s) of a single recording and/or the price(s) of the album(s) featuring the song.

In the case of a television show, program, or movie, the memory device 10C can contain any one or more of the name of the show, program, or movie, the actor(s) featured in the show, program, or movie, the producer(s) and/or director(s) of the show, program, or movie, the writer(s) or composer(s) of the show, program, or movie, the theme of the show, program, or movie, the year produced, and/or the price of a recording or tape of the show, program, or movie.

The memory device 10C can also contain media content which is available for broadcast to any of the herein-described media playing devices 20.

With reference to FIG. 2, the broadcasting system 10 can also include a receiver 10D for receiving data and/or information which can be transmitted to the broadcasting system 10 from any of the herein-described media playing devices 20 and/or any of the herein-described central processing facility computers 30.

The broadcasting system 10 can also include a transmitter 10E for transmitting data and/or information to any of the herein-described media playing devices 20 and/or any of the herein-described central processing facility computers 30.

In the preferred embodiment, the media content can be provided with any of the herein-described information which can be provided in a header field and/or which can be encoded into the main body of the media content. In the case of a live broadcast of media content, from a storage medium, the information can be broadcast along with the media content from the storage medium. In another preferred embodiment, the central processing computer 10 can encode the pertinent information into the media content of a live broadcast and/or into the live broadcast of media content which is stored on a storage medium.

Figure 3:
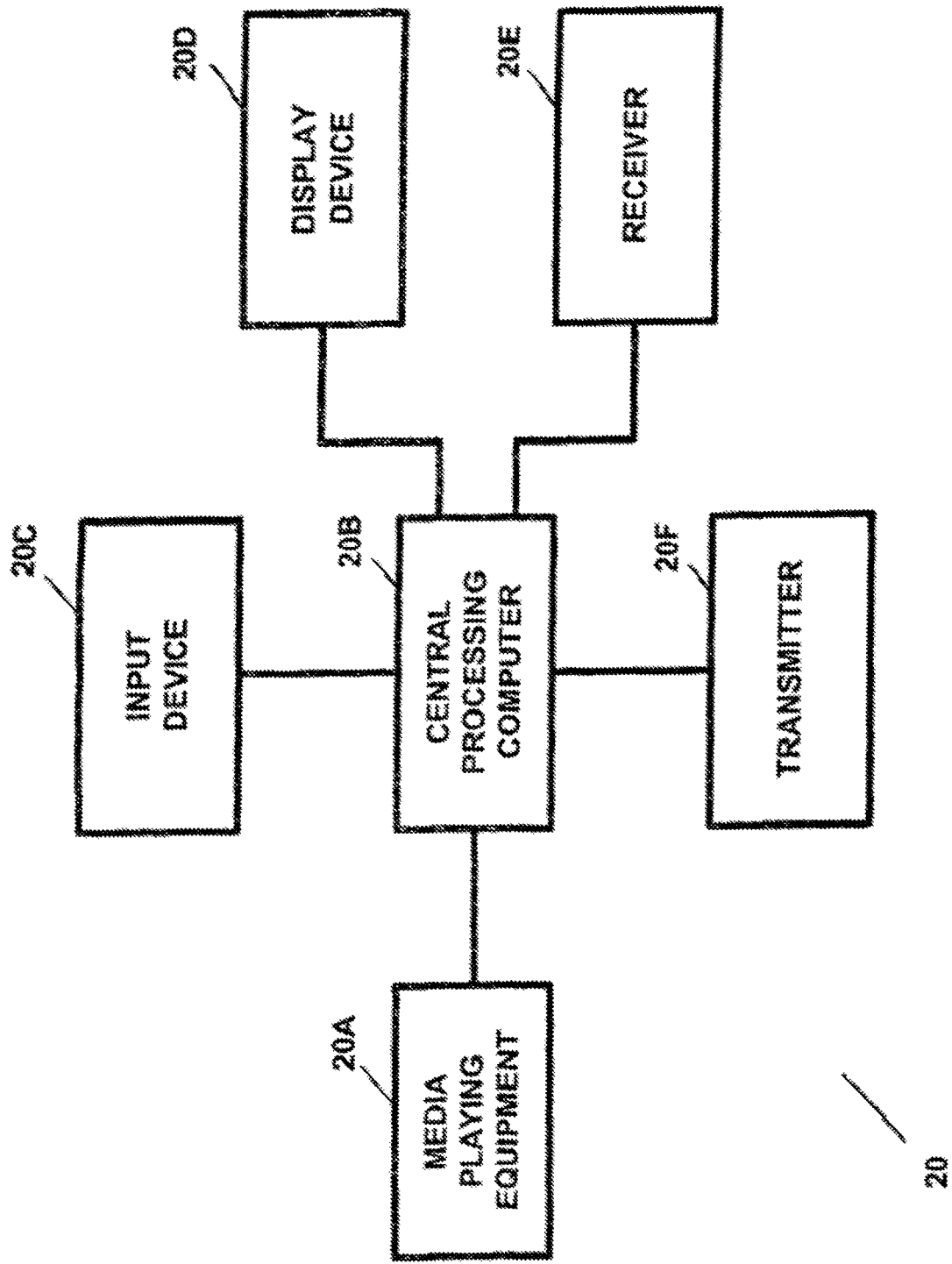
FIG. 3 illustrates the media playing device of FIG. 1, in block diagram form.

FIG. 3 illustrates the media playing device 20 of FIG. 1, in black diagram form. The media playing device 20 can include media playing device equipment 20A which can include any and/or all of the components and systems of the respective media playing device 20. The media playing device equipment 20A can also include a reading device for reading information from a storage medium, such as, but not limited to, a compact disc, a digital video disc or digital versatile disc (DVD), a laser disc, a tape, a video cassette tape, an MP3 storage device, and/or any other storage medium or device described herein.

The media playing device 20 can also include a central processing computer 20B. The central processing computer 20B can include a processor(s), a random access memory (RAM) device(s), a read only memory (ROM) device(s), an input device(s), a display device(s), an output device(s), and/or any other components or devices, including peripheral devices, for performing any of the functionality described herein. The central processing computer 20B can be utilized in order to process the information pertaining to the media content and/or to control the display of same. The central processing computer 20B is linked to, or connected to, the media playing equipment 20A.

With reference to FIG. 3, the media playing device 20 can also include an input device 20C, which can include a remote control device, for inputting information and/or commands into the media playing device 20. The remote control device can be utilized in order to provide remote control over the operation of the media playing device 20 and/or the central processing computer 20B.

The media playing device 20 can also include a display device 20D for displaying any of the information described-herein as being provided by the apparatus 100.

The display device 20D can be a separate display device dedicated to the display of the information provided by the apparatus 100 of the present invention. The display device 20D can also be integrated with the respective display screen or control panel of the respective media playing device 20. For example, the display device 20D can be a radio display screen, a radio control panel display, a television display screen, a television control panel display, a compact disc player display, a laser disc player display, a video cassette player display, a digital video disc or digital versatile disc player display, a tape player display, an MP3 player display, and/or computer display screen.

The display device 20D can also be located on the remote control device 20B in addition to, and/or instead of, can located at, or on, the media playing device 20.

With reference to FIG. 3, the media playing device 20 can also include a receiver 20E for receiving data and or information which can be transmitted to the media playing device 20 from any of the herein-described broadcasting systems 10 and/or any of the herein-described central processing facility computers 30. The media playing device 20 can also include a transmitter 20F for transmitting data and/or information to any of the herein-described broadcasting systems 10 and/or any of the herein-described central processing facility computers 30.

The apparatus 100 can be utilized in order to provide information relating to media content, and/or goods or services, such as, for exam audio information, video information, and/or audio and video information. In a preferred embodiment, the information can be provided along with media content which is being broadcast to a media playing device, in another preferred embodiment, the apparatus 100 can provide information which can be provided along with media content which is being played from a storage medium located at or in the respective media player 20.

Figure 4:
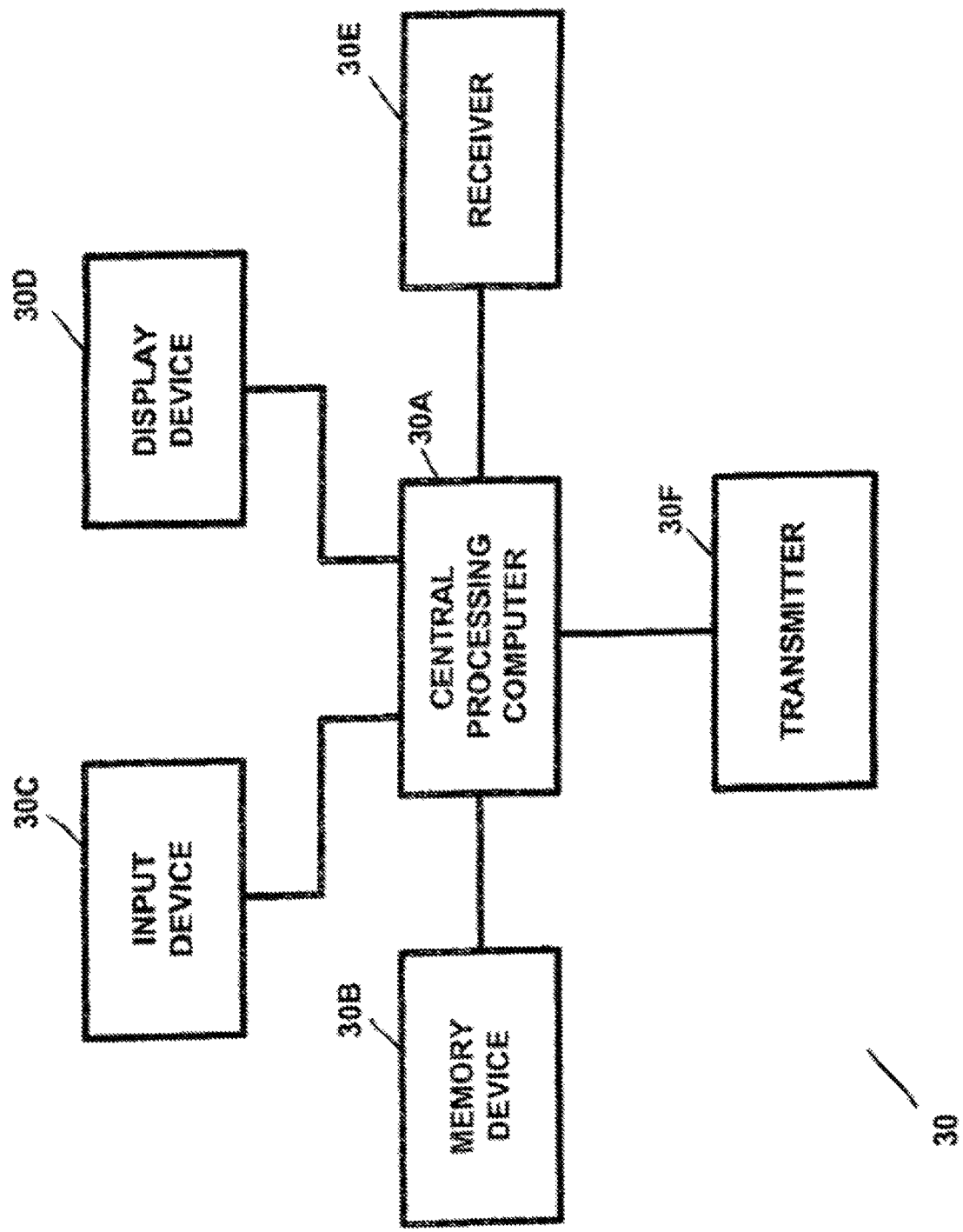
FIG. 4 illustrates the central processing facility computer of FIG. 1, in block diagram form.

FIG. 4 illustrates the central processing facility computer 30 of FIG. 1, in block diagram form. The central processing facility computer 30 can include a central processing computer 30A. The central processing computer 30A can include a processor(s), a random access memory (RAM) device(s), a read only memory (ROM) device(s), an input device(s), a display device(s), an output device(s), and/or any other components or devices, including peripheral devices, for performing any of the functionality described herein. The central processing computer 30A can be utilized in order to process purchase orders or purchase requests, along with any information pertaining to the media content, goods, or services, in order to process transactions involving the respective media contents goods, or services.

With reference to FIG. 4, the central processing facility 30 also includes a memory device 30B for storing any of the data and/or information needed and/or desired for processing any of the transactions described herein and/or for performing any of the functionality and/or processing routines described herein as being performed by the central processing facility computer(s) 30.

With reference to FIG. 4, the central processing facility computer 30 can also include an input device 30C for inputting information and/or commands into the central processing facility computer 30. The central processing facility computer 30 can also include a display device 30D, for displaying any of the information described-herein as being provided by the apparatus 100.

With reference to FIG. 4, the central processing facility computer 30 can also include a receiver 30E, for receiving data and/or information which can be transmitted to the central processing facility computer 30 from any of the herein-described media playing devices 20 and/or any of the herein-described broadcasting systems 10.

The central processing facility computer 30 can also include a transmitter 30F, for transmitting data and/or information to any of the herein-described media playing devices 20 and/or any of the her broadcasting systems 10.

In a preferred embodiment, the apparatus 100 can provide any of the herein-described in along with the media content which is being broadcast, to a media playing device 20. The apparatus 100 can facilitate the ordering or purchasing of media content, a copy of the media content, and/or any good(s) or service(s), by utilizing the information relating thereto in conjunction with a respective purchase order or purchase request, which can be placed by an individual from a media playing device 20.

Figure 5A:
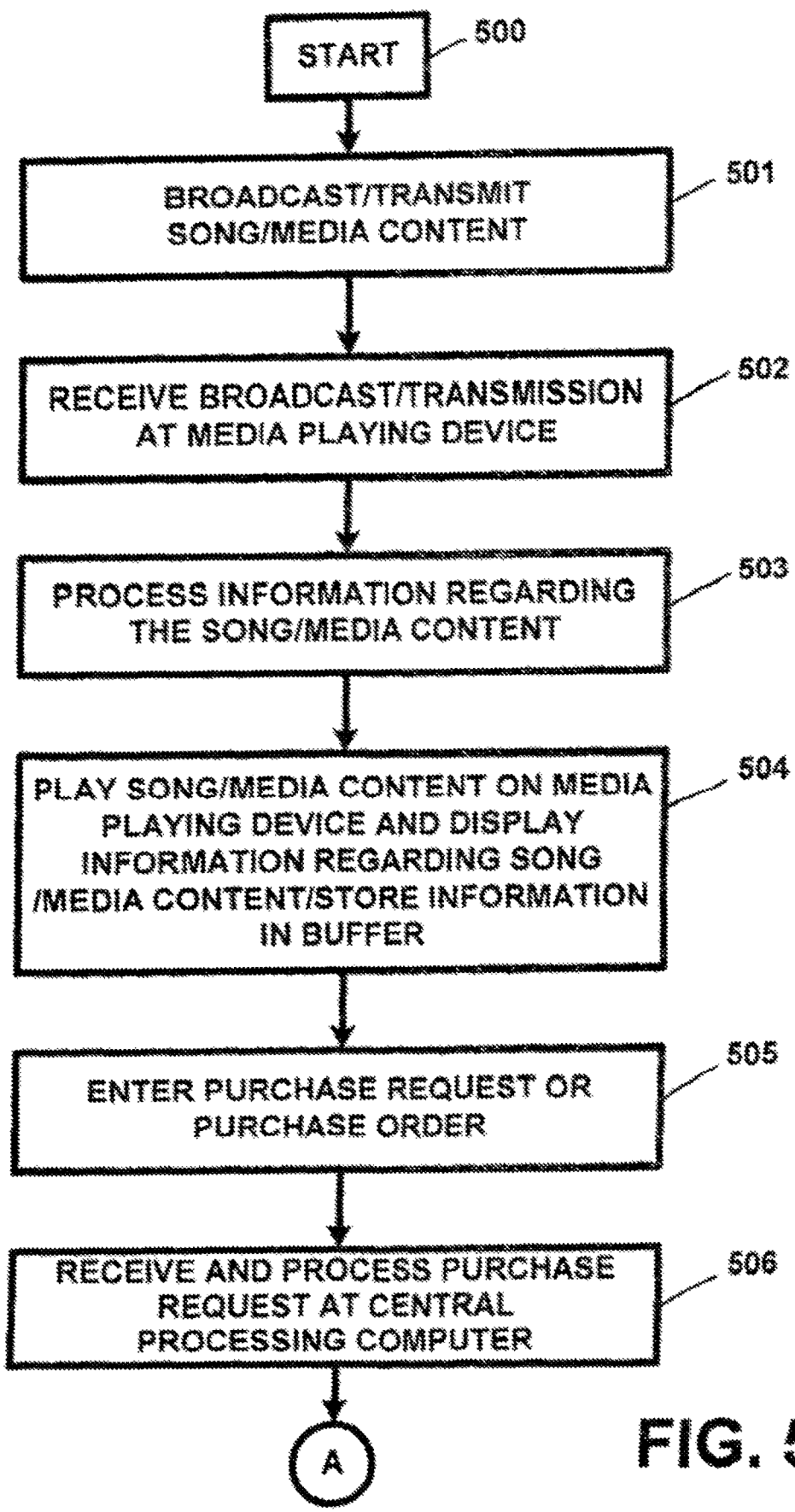
FIGS. 5A and 5B illustrate a preferred embodiment method for utilizing the apparatus of the present invention, in flow diagram form.
Figure 5B:
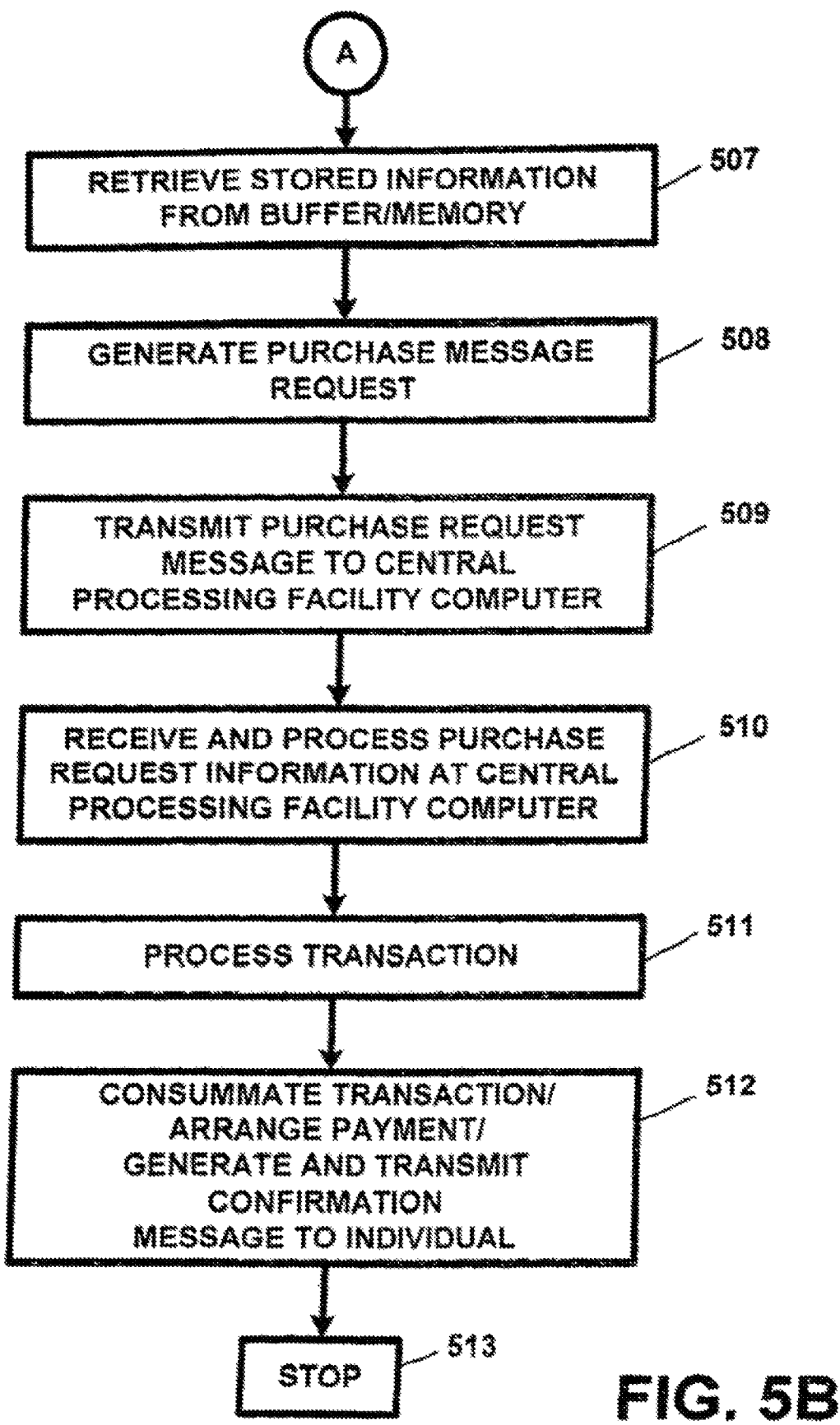

FIGS. 5A and 5B illustrate a preferred embodiment method for utilizing the apparatus 100, in flow diagram form. In the embodiment of FIGS. 5A and 5B, the apparatus 100 can be utilized in order to provide broadcasts of audio information, such as from a radio broadcast, or other transmitted broadcast of music, a song, and/or other audio information, along with any of the herein-described information. For example, apparatus 100 can provide a radio broadcast of a song.

In conjunction with the song, the apparatus 100 can provide any and/or all of the herein-described information pertaining to, and/or relating to, the song, such as, for example, information regarding the name of the song, the performer(s) of the song, the composer(s) of the song, the producer(s) of song, the album on which the song appears, the price of a song single, the price(s) of an album(s) on which the song can be found, an identification number pertaining to the song, order information pertaining to the song, and/or any other pertinent and/or relevant information regarding the song. The apparatus 100 can also provide information regarding goods or services.

The information provided with the song can then be utilized in order to allow an individual to place a purchase order or purchase request for a copy of the song, and/or to place a purchase order or purchase request for any good(s) or service(s), via the media playing device 20. The information identifying the song, good(s), or service(s), along with the individual's purchase order or purchase request for the respective song, an album featuring the song, and/or the good(s) or service(s) can then be transmitted from the individual's media playing device 20 to the central processing facility computer 30 for transaction processing.

In the case of other audio information, such as, for example, news broadcasts, talk radio shows, and/or other audio content which can be broadcast over the radio or other broadcast medium, the information can include any information pertinent and/or relevant to the broadcast or show. This information can include news story name, title, description, place or time of occurrence, talk show subject matter, and/or participants.

Any of the herein-described information can be transmitted along with the audio information, song, or broadcast. The herein-described information can be encoded into a digital, recording or digital file of the respective audio information, song, music, or broadcast subject matter.

The information can also be encoded and stored at the beginning of the respective audio information, such as in a header portion of the audio information, an for the information can be multiplexed with, and/or mixed with, the entire, or at least a portion of the, audio information. The information can be stored, along with the audio information on, and played or broadcast from, a compact disc, a digital video disc or digital versatile disc (DVD), a tape, an MP3 storage device, and/or any other storage medium.

In another preferred embodiment, the information can be broadcast along with the audio information by being co-broadcast, a portion of the signal bandwidth, by any suitable transmitter or transmission system. The information can also be encoded into, and/or with, the broadcast signal, and/or can be contained in pulses and/or trains of pulses containing data representing the herein-described information.

In the embodiment of FIGS. 5A and 5B, the operation of the apparatus 100 is described in conjunction with providing the herein-described information in conjunction with a radio broadcast of a song or selection of music. While in the preferred embodiment, the apparatus 100 is described in conjunction with a radio broadcast of a song, the apparatus 100 of FIGS. 5A and 5B can also be utilized in conjunction with Internet transmissions or broadcasts, MP3 transmissions or broadcasts, digital transmissions or broadcasts, analog transmissions or broadcasts, radio frequency transmissions or broadcasts, satellite transmissions or broadcasts, and/or via any other suitable transmissions or broadcasts.

Figure 6A:
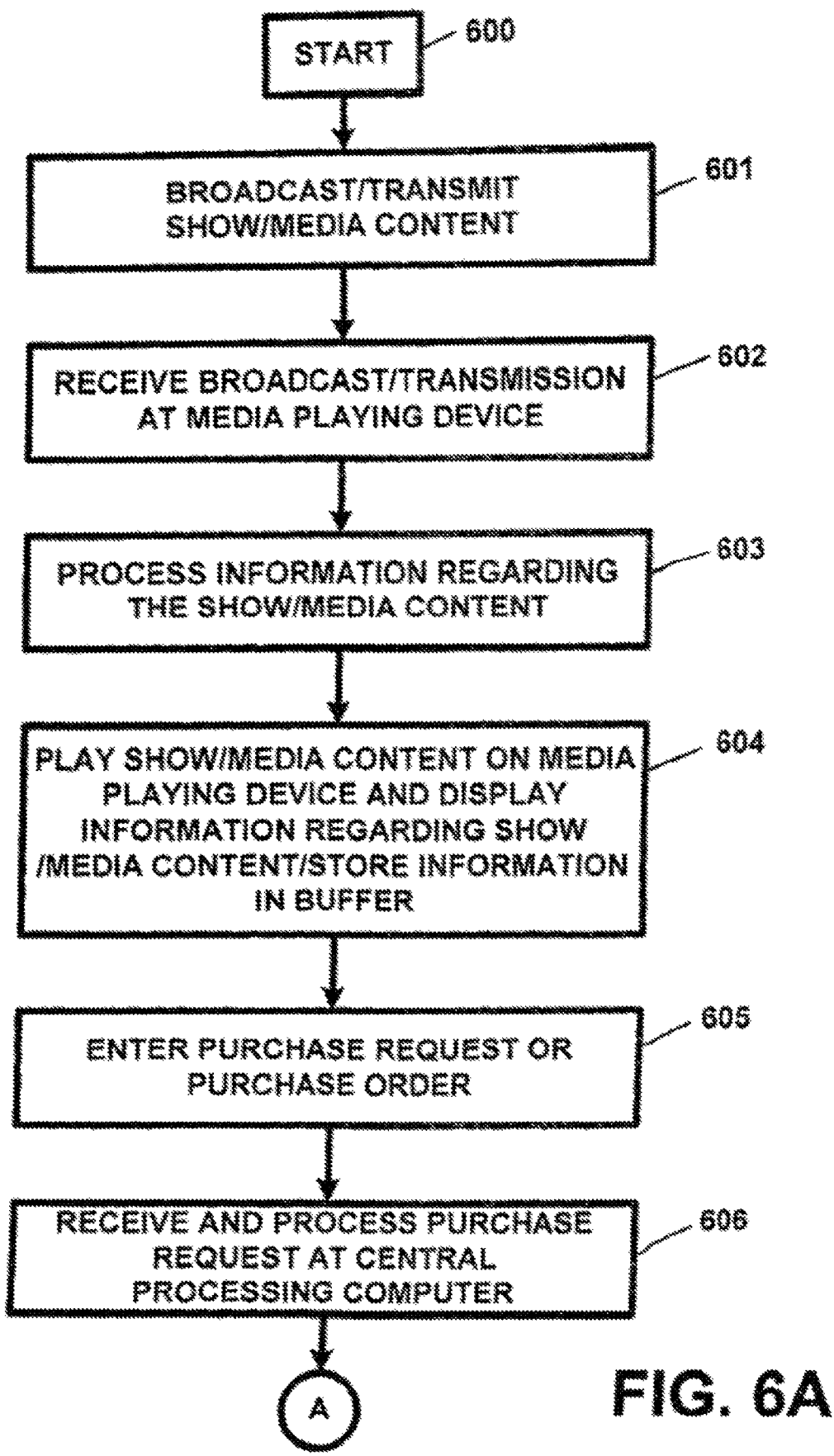
FIGS. 6A and 6B illustrate another preferred embodiment method for utilizing the apparatus of the present invention, in flow diagram form.
Figure 6B:
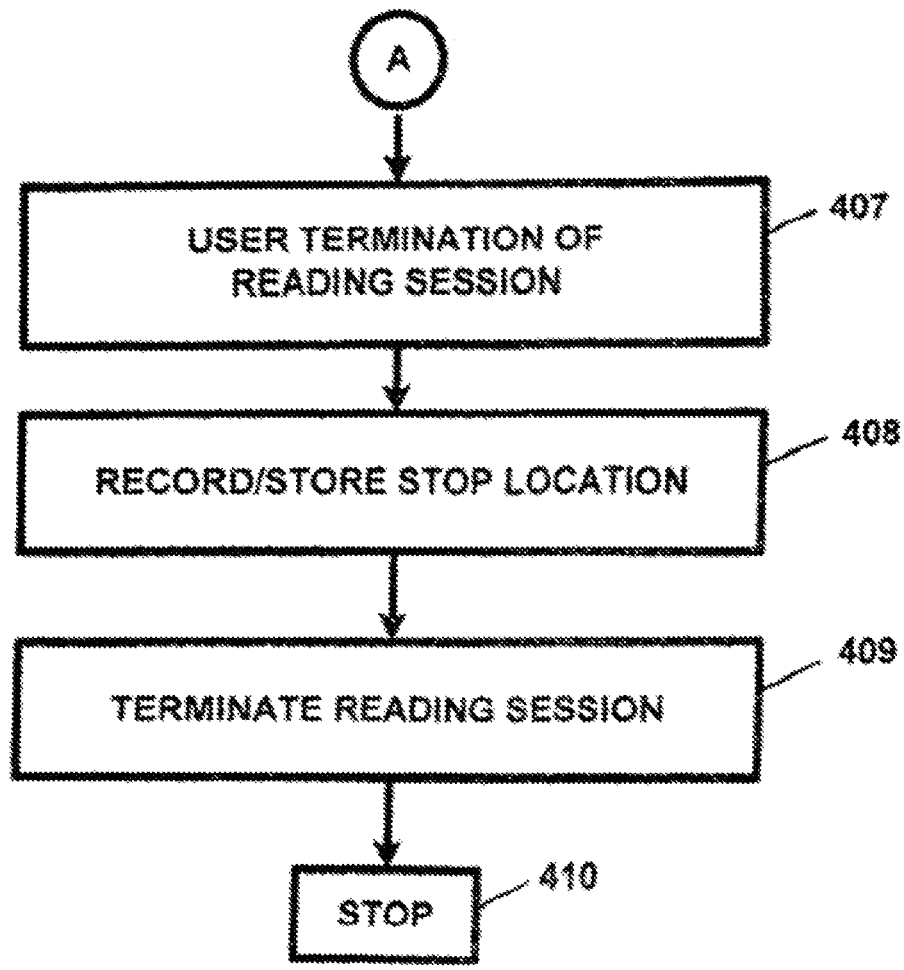

With reference to FIGS. 6A and 6B, the operation of the apparatus 100 commences at step 500. At step 501, the broadcasting system 10 broadcasts or transmits the song or selection of music along with the herein-described informal on regarding the song or selection of music. At step 501, the broadcasting system 10 can broadcast or transmit the song or selection of music to any number of media playing devices 20. In the embodiment of FIGS. 5A and 5B, the media playing device 20 can be any one or more of a radio, a radio receiver, a mobile radio (i.e. car radio, etc.), and/or any other device for receiving the broadcast or transmission. As noted above, the information which is transmitted along with the song or selection of music can also include information regarding goods and/or services.

At step 502, the media playing device 20 associated with the individual can receive the broadcast. At step 503, the media playing device 20 can process the information received in the broadcast, At step 503, the central processing computer 20B can process the information pertaining to, and/or regarding, the broadcast, which can be transmitted as a header to the song or selection of music, which can be transmitted throughout the broadcast of the song or selection of music, and/or which can be transmitted during a portion of the song or selection of music.

At step 604, the media playing device 20 can begin playing the song or selection of music. At step 504, the information pertaining to, and/or relating, to the song or selection of music can be stored in a memory location or buffer and can be displayed on the display device 20D. Any information pertaining to, and/or relating to, any good(s) and/or service(s), can also be stored to a memory location or buffer and can be displayed on the display device 20D.

At step 504, the information can be displayed on the display 20D in order to be viewed by the listener. In another preferred embodiment, the information can be stored by the central processing computer 20B in a buffer or memory storage device and can be concealed from the listener. In this manner, the information, which may not available for viewing, can still be available for use in conjunction with the listener's placing of an order for, or entering into a transaction regarding, a copy of the respective song or selection of music, and/or for placing an order for, or entering into a transaction regarding, any good(s) and/or service(s).

In the case of information provided in a header file, the central processing computer 20B can latch or store the information in a buffer or memory device and, thereafter, display the information on the display device 20D. In the case of information which is multiplexed with, mixed with, or transmitted along with, the broadcast and/or with the audio information, the central processing computer 20B can continuously process the information, such as at pre-determined time intervals, and latch or store the information in a buffer or memory device.

At step 504, the information can be displayed on any one or more of the display device 20D, the radio display console, and/or a display device located on the radio remote control device 20C. The displayed information can include any one or more of the name of the song, the performer(s) of the song, the composer(s) of the song, the producer(s) of the song, the album on which the song appears, the price of a song single, the price(s) of an album(s) on which the song can be found, an identification number pertaining to the song, order identification information, and/or any other pertinent and/or relevant information regarding the song.

The information can be displayed on the display device 20D which can be a dedicated display device, for displaying the above-described information, and/or which can be integrated into the radio control panel console display and/or the display on the radio remote control device 20C. In this manner, the apparatus 100 can provide the individual who is listening to the song with any of the herein-described information.

The displayed information can also include information regarding goods or services. The information regarding goods or services can include marketing information, sales information, promotional information, advertisement information, and/or any other information for facilitating a sale of a respective good or service and/or for promoting a respective good or service.

At step 504, the information pertaining to, and/or, relating to, the song or selection of music, as well as any information regarding goods or services, can be displayed on the display device 20D, and/or can be stored in a buffer or memory device, for the duration of the song or selection of music or for a portion of the song or selection of music.

At any time during the playing of the song, the individual can place an order to buy or purchase a copy of the song or an album on which the song is featured. The individual can also place an order to buy or purchase a good(s) and/or service(s). At step 505, the individual, upon deciding to purchase a copy of the song or album, and/or a good(s) and/or a service(s), can enter a purchase request or purchase order regarding the song or album, and/or a good(s) and/or service(s), into the input device 20D. At step 506, the central processing device 20B will receive and process the purchase order or purchase request. The central processing computer 20B will then, at step 507, retrieve information which is stored in the memory or buffer regarding the respective song or album. The retrieved information Pen include identification number or other identification information for the respective song, album, good(s) and/or service(s), price information, and/or any other information which can be utilized in order to effect a purchase of a copy of the song or album, and/or the respective good(s) and/or service(s).

At step 508, the central processing computer 20B can generate a purchase request message which can include the name of the respective song, album, good(s) and/or service(s), being ordered, the identification number for the respective song, album, good(s) and/or service(s), being ordered, the price of the respective song, album, good(s) and/or service(s), being ordered identification information regarding the individual's account and/or the account associated with the media playing device 20 from which the order is being placed, and/or any other data and/or information for identifying the individual.

The purchase request message can be generated as any one of more of an e-mail message, an instant messaging service message, a facsimile message, a telephone message, and/or an electronic transmission of any kind.

At step 509, the media playing device 20 can transmit the purchase request message to the central processing facility computer 30. At step 510, the central processing facility computer 30 can receive the purchase request message. At step 511, the central processing facility computer 30 can process the transaction involving the information contained in the purchase request message.

At step 511, the central processing facility computer 30 can also process the transaction in conjunction with data and/or information regarding the individual which can be stored in, or at, the central processing facility computer 30. For example, the central processing facility computer 30 can store information regarding the individual which can include the individual's, name, address, shipping address, credit, card identifier information, debit card identifier information, media playing device identification code, and/or any other information for facilitating the transaction involving the song or album.

At step 512, the central processing facility computer 30 can consummate the transaction, arrange for payment from the individual, and/or arrange for shipment of the respective copy of the song or album, and/or the respective good(s) and/or service(s), to the individual. At step 512, the central processing facility computer 30 can also generate an order confirmation message and transmit same to the individual's media playing device 20 via any one or more of a an e-mail message, an instant messaging serve message, a facsimile message, a telephone message, and/or an electronic transmission of any kind.

Thereafter, the operation of the apparatus 100 will cease at step 513. The above-described process can be repeated for a next song received from the broadcasting system 10.

FIGS. 6A and 6B illustrate another preferred embodiment method for utilizing the apparatus 100, in flow diagram form. In the embodiment of FIGS. 6A and 6B, the apparatus 100 can be utilized order to provide broadcasts of video information and/or audio and video information, such as a television broadcast or other transmitted broadcast of television shows, television programs, movies, performances, music videos, etc., along with any of the herein-described information. For example, the apparatus 100 can provide a television broadcast of a television show, a television program, a performance, or a movie (hereinafter referred, to as a "show").

In conjunction with the show, the apparatus 100 can provide any and/or all of the herein-described information pertaining to, and/or relating to, the show, such as, for example, information regarding the name of the show, the performer(s) in the show, the actor(s) appearing in the show, the producer(s) of director(s) of the show, the price of a copy of the show, an identification number pertaining to the show, order information regarding the show and/or any other pertinent and/or relevant information regarding the show. The apparatus 100 can also provide information regarding goods or services.

The information provided with the show an then be utilized in order to allow an individual to place a purchase order or purchase request for a copy of the show, and/or to place a purchase order or purchase request for any good(s) or service(s), via the media playing device 20. The information identifying the show, good(s), or service(s) along with the individual's purchase order or purchase request for the respective show, good(s) or service(s), can then be transmitted from the individual's media playing device 20 to the central processing facility computer 30 for transaction processing.

In the case of other video information, such as, for example, a news broadcast, a talk radio show, and/or any other video content, which can be broadcast over the broadcast medium, the information can include any information pertinent to, and/or relevant to, the broadcast or show. This information can include the show name, title, description, or story line, the actor(s) or performer(s) in the show, the producer(s) or director(s) of the show, the place or time of occurrence of the show, talk show subject matter, or show participants, etc.

Any of the herein described information can be transmitted along with the video information, show, or broadcast. The herein-described information can be encoded into a digital recording or digital file of the respective video information, show, or broadcast subject matter.

The information can be encoded and stored at the beginning of the respective video file, such as in a header portion of the video information, and/or the information can be multiplexed with, and/or mixed with, the entire, or at least a portion of the, video information. The information can be stored, along with the video information, on a compact disc, a digital video disc or digital versatile disc (DVD), a laser disc, a video cassette tape, a streaming video file storage medium, and/or any other storage medium.

In another preferred embodiment, the information can be broadcast along with the video information by being co-broadcast, in a portion of the signal bandwidth, by a suitable transmitter or transmission system. The information can also be encoded into, and/or with the broadcast signal, and/or can be transmitted as a series of pulses or trains of pulses containing data representing the here herein-described information.

In the embodiment of FIGS. 6A and 6B, the operation of the apparatus 100 is described in conjunction with providing the herein-described information in conjunction with a television broadcast of a show. While in the preferred embodiment, the apparatus 100 is described in conjunction with a television broadcast of a show, the apparatus 100 of FIGS. 6A and 6B can also be utilized in conjunction with Internet transmissions or broadcasts, streaming video transmissions or broadcasts, digital transmissions or broadcasts, analog transmissions or broadcasts, radio frequency transmissions or broadcasts, satellite transmissions or broadcasts, and/or via any other suitable transmissions or broadcasts.

With reference to FIGS. 6A and 6B, the operation of the apparatus 100 commences at step 600. At step 601, the broadcasting system 10 broadcasts or transmits the show along with the herein-described information regarding the show. At step 601, the broadcasting system 10 can broadcast or transmit the show to any number of media playing devices 20. In the embodiment of FIGS. 6A and 6B, the media playing device 20 can be any one or more of a television, a television receiver, a portable television (i.e. a car television, handheld television, etc.), and/or any other device for receiving the broadcast or transmission. As noted above, the information which is transmitted along with the show can also include information regarding goods and/or services.

At step 602, the media playing device 20 associated with the individual can receive the broadcast. At step 603, the media playing device 20 can process the information received in the broadcast. At step 603, the central processing computer 20B can process the information pertaining to, and/or regarding, the broadcast, which can be transmitted as a header to the show, which can be transmitted throughout the broadcast of the show, and/or which can be transmitted during a portion of the show.

At step 604, the media playing device 20 can begin playing the show. At step 604, the information pertaining to, and/or relating to, the show can be stored in a memory location or buffer and can be displayed on the display device 20D. Any information pertaining to, and/or relating to, any good(s) and/or service(s), can also be stored in a memory location or buffer and can be displayed on the display device 20D.

At step 604 the information can be displayed on the display 20D in order to be viewed by the viewer. In another preferred embodiment, the information can be stored by the central processing computer 20B in a buffer or memory storage device and can be concealed from the viewer. In this manner, the information, which is not available for viewing, can still be available for use in conjunction with the viewer's placing of an order for, or entering into a transaction regarding, a copy of the respective show, and/or for placing an order for, or entering into a transaction regarding, any good(s) and/or service(s).

In the case of information provided in a header file the central processing computer 20B can latch or store the information in a buffer or memory device and, thereafter, display the information on the display device 20D. In the case of information which is multiplexed with, mixed with, or transmitted along with, the broadcast and/or with the video information, the central processing computer 20B can continuously process the information, such as at pre-determined time intervals, and latch or store the information in a buffer or memory device.

At step 604, the information can be displayed on any one or more of the display device 20D, the television display screen or display console, and/or a display device located on the television remote control device 20C. In this manner, the apparatus 100 can provide the individual who is viewing the show with any of the herein-described information.

The displayed information can also include information regarding goods or services. The information regarding goods or services can include marketing information, sales information, promotional information, advertisement information, and/or any other information for facilitating a sale of a respective good or service and/or for promoting a respective good or service.

At step 604, the information pertaining to, and/or relating to, the show, as well as any information regarding goods or services, can be displayed on the display device 20D, and/or can be stored in a buffer or memory device, for the duration of the show or for a portion of the show.

At any time during the playing of the show, the individual can place an order to buy or purchase a copy of the show. The individual can also place an order to buy or purchase a good(s) and or a service(s). At step 605, the individual, upon deciding to purchase a copy of the show, and/or a good(s) and/or a service(s), can enter a purchase request or purchase order regarding the show, and/or a good(s) and/or a service(s), into the input device 20D. At step 606, the central processing device 20B will receive and process the purchase order or purchase request. The central processing computer 20B will then, at step 607, retrieve information which is stored in the memory or buffer regarding the show. The retrieved information can include the identification number or other identification information, price information, and/or any other information which can be utilized in order to effect a purchase of a copy of the show, and/or the respective good(s) and/or service(s).

At step 608, the central processing computer 20B can generate a purchase request message which can include the name of the respective show, good(s) and/or service(s), being ordered, the identification number for the respective show, good(s) and/or service(s), being ordered, the price of the respective show, good(s) and/or service(s), being ordered, identification information regarding the individual's account and/or the account associated with the media playing device 20 from which the order is being placed, and/or any other data and/or information for identifying the individual.

The purchase request message can be generated as any one of more of an e-mail message, an instant messaging service message, a facsimile message, a telephone message, and/or an electronic transmission of any kind.

At step 609, the media playing device 20 can transmit the purchase request message to the central processing facility computer 30. At step 610, the central processing facility computer 30 can receive the purchase request message. At step 611, the central processing facility computer 30 can process the transaction involving the information contained in the purchase request message.

At step 611, the central processing facility computer 30 can also process the transaction in conjunction with data and/or information regarding the individual which can be stored in, or at, the central processing facility computer 30. For example, the central processing facility computer 30 can store information regarding the individual which can include the individual's, name, address, shipping address, credit card identifier information, debit card identifier information, media playing device identification code, and/or any other information for facilitating the transaction involving the show.

At step 612, the central processing facility computer 30 can consummate the transaction, arrange for payment from the individual, and/or arrange for shipment of the copy of the show, and/or the respective good(s) and/or service(s), to the individual. At step 612, the central processing facility computer 30 can also generate an order confirmation message and transmit same to the individual's media playing device 20 via any one or more of a an e-mail message, an instant messaging service message, a facsimile message, a telephone message, and/or an electronic transmission of any kind.

Thereafter, the operation of the apparatus 100 will cease at step 613. The above-described process can be repeated for a next show received from the broadcasting system 10.

In the above-described manner, the apparatus and method of the present invention can be utilized in order to facilitate a purchase of media content, or a copy of media content, and/or to facilitate the purchase of a good(s) and/or service(s), by utilizing information which can be provided on a media playing device.

While the present invention has been described and illustrated to various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

The invention claimed is:

1. An apparatus for providing content with additional information, the apparatus comprising:
   memory storage storing media content, information regarding the media content, and information regarding a product, the information regarding the product comprising information for facilitating a transaction relating to the product, the information regarding the media content comprising a unique identifier of the media content;

a transmitter configured to transmit to a media playing device the media content, the information regarding the media content, and the information for facilitating the transaction;

a processing device coupled to the memory storage and the transmitter, wherein the processing device is configured to process the information regarding the media content and the information for facilitating the transaction;

wherein the apparatus is configured so that the transmitter transmits to the media playing device the media content together with the information for facilitating the transaction and the information regarding the media content.

2. The apparatus of claim 1, wherein the media content comprises at least one of an audio program and a video program.

3. The apparatus of claim 1, wherein the information regarding the media content comprises information describing the media content.

4. The apparatus of claim 1, wherein the media content comprises a song, and the information regarding the media content comprises an information item selected from the group consisting of a name of the song, a name of an album on which the song is featured, a name of a performer of the song, a name of a producer of the song, a name of a composer of the song, a theme of the song, and a year the song was produced.

5. The apparatus of claim 1, wherein the media content comprises a video program, and the information regarding the media content comprises information item selected from the group consisting of a name of the video program, a name of a participant in the video program, a name of a producer of the video program, a name of a director of the video program, a name of a writer of the video program, a theme of the video program, a year the video program was produced, a place of occurrence of the video program, and a subject matter of the video program.

6. The apparatus of claim 1, wherein the unique identifier comprises a unique identification number associated with the media content.

7. The apparatus of claim 1, wherein the information for facilitating the transaction comprises identification information of the product.

8. The apparatus of claim 7, wherein the product comprises a right to the media content.

9. The apparatus of claim 1, wherein the transmitter is configured to transmit to the media playing device the media content, the information regarding the media content, and the information for facilitating the transaction by broadcasting the media content, the information regarding the media content, and the information for facilitating the transaction.

10. The apparatus of claim 1, wherein the transmitter is configured to transmit to the media playing device the media content, the information regarding the media content, and the information for facilitating the transaction by transmitting over the Internet the media content, the information regarding the media content, and the information for facilitating the transaction.

11. The apparatus of claim 1, wherein the media playing device comprises a mobile electronic device.

12. The apparatus of claim 1, wherein the transmitter is configured to transmit to the media playing device the media content, the information regarding the media content, and the information for facilitating the transaction by transmitting to the media playing device over a communication network the media content, the information regarding the media content, and the information for facilitating the transaction.

13. The apparatus of claim 1, wherein the transmitter is configured to transmit to the media playing device the media content, the information regarding the media content, and the information for facilitating the transaction by transmitting to the media playing device over a wireless communication network the media content, the information regarding the media content, and the information for facilitating the transaction.

14. The apparatus of claim 13, wherein:
the wireless communication network is a cellular communication network, and
the media playing device is a mobile device.

15. The apparatus of claim 1, wherein the information for facilitating the transaction is at least one of: encoded into at least a portion of the media content, encoded into a broadcast signal, co-broadcast in a portion of a signal bandwidth, transmitted during at least a portion of transmission of the media content by the transmitter, and multiplexed with at least a portion of the media content.

16. The apparatus of claim 1, wherein the transmitter is configured to transmit to the media playing device the information for facilitating the transaction it a header file.

17. A computer-implemented method for providing content with additional information, the computer-implemented method comprising steps of:
storing, in a machine-readable storage medium, media content, information regarding the media content, and information regarding a product, the information regarding the product comprising information for facilitating a transaction relating to the product, the information regarding the media content comprising a unique identifier of the media content;
processing on a processor coupled to the storage medium the information regarding the media content and the information for facilitating the transaction; and
transmitting, through a transmitter coupled to the processor, to a media playing device, the media content together with the information for facilitating the transaction, and the information regarding the media content.

18. The computer-implemented method of claim 17, wherein the media content comprises at least one of an audio program and a video program, and the step of transmitting comprises broadcasting the media content together with the information for facilitating the transaction, and the information regarding the media content.

19. The computer-implemented method of claim 17, wherein the information regarding the media content comprises information describing the media content.

20. The computer-implemented method of claim 17, wherein the step of transmitting comprises broadcasting through the Internet.

21. The computer implemented method of claim 17, wherein the step of transmitting is performed over a wireless communication network.

* * * * *

UNITED STATES PATENT AND TRADEMARK OFFICE
CERTIFICATE OF CORRECTION

PATENT NO. : 10,504,168 B2  
APPLICATION NO. : 15/964995  
DATED : December 10, 2019  
INVENTOR(S) : Alexander I. Poltorak Page 1 of 1

It is certified that error appears in the above-identified patent and that said Letters Patent is hereby corrected as shown below:

In the Specification

Column 1, Line 15, cancel "whish" and replace the cancelled text with --which--;

Column 17, Line 16, cancel "FIGS. 6A and 6B," and replace the cancelled text with --FIGS. 5A and 5B,--;

Column 17, Line 40, cancel "604," and replace the cancelled text with --504,--;

Column 19, Line 60, cancel "show an then" and replace the cancelled text with --show can then--;

In the Claims

Column 24, Line 30, Claim 16 cancel "it a header file." and replace the cancelled text with --in a header file.--.

Signed and Sealed this  
Eleventh Day of February, 2020

Andrei Iancu  
*Director of the United States Patent and Trademark Office*